United States Patent
Takahashi et al.

(10) Patent No.: US 7,194,176 B2
(45) Date of Patent: Mar. 20, 2007

(54) FUNCTIONAL OPTICAL DEVICES AND METHODS FOR PRODUCING THEM

(75) Inventors: Shiro Takahashi, Singapore (SG); Hisanori Suzuki, Singapore (SG); Junjie Si, Shanghai (CN); Myint Myint Aye, Saitama (JP); Liping Zuo, Singapore (SG); Hsin Yuan Kenneth Kong, Singapore (SG); Atsushi Watabe, Kunitachi (JP)

(73) Assignee: Hoya Corporation, Tokyo (JP)

( * ) Notice: Subject to any disclaimer, the term of this patent is extended or adjusted under 35 U.S.C. 154(b) by 53 days.

(21) Appl. No.: 10/516,058

(22) PCT Filed: May 29, 2002

(86) PCT No.: PCT/SG03/00127

§ 371 (c)(1), (2), (4) Date: Nov. 29, 2004

(87) PCT Pub. No.: WO03/100483

PCT Pub. Date: Dec. 4, 2003

(65) Prior Publication Data

US 2005/0169580 A1 Aug. 4, 2005

(30) Foreign Application Priority Data

May 29, 2002 (SG) .................. 0203247-2
Aug. 19, 2002 (SG) .................. 0204922-9

(51) Int. Cl.
*G02B 6/132* (2006.01)
*G02B 6/125* (2006.01)

(52) U.S. Cl. .................. 385/132; 438/31; 385/37; 385/39

(58) Field of Classification Search .................. 438/31; 385/37, 132
See application file for complete search history.

(56) References Cited

U.S. PATENT DOCUMENTS

| 6,022,671 | A | 2/2000 | Binkley et al. | |
|---|---|---|---|---|
| 6,201,918 | B1 | 3/2001 | Berkey et al. | |
| 6,253,015 | B1 | 6/2001 | Ukrainczyk | |
| 6,304,687 | B1 | 10/2001 | Inoue et al. | |
| 6,449,417 | B1 * | 9/2002 | Binkley et al. | ............. 385/129 |
| 6,466,707 | B1 * | 10/2002 | Dawes et al. | .................. 385/14 |

FOREIGN PATENT DOCUMENTS

| EP | 1067410 A2 | 10/2001 |
|---|---|---|
| JP | 08005834 | 12/1996 |

* cited by examiner

*Primary Examiner*—Michelle Connelly-Cushwa
(74) *Attorney, Agent, or Firm*—Conley Rose, P.C.

(57) ABSTRACT

A functional optical device has cores which are trenches, different portions of the cores being formed from different core materials. The optical device can be formed by forming trenches 5,7,9 within a substrate (normally a substrate 1 covered by a cladding layer 3), covering at least part of at least one trench 7 with a cover 11, depositing a first cladding material to fill the trenches 5,9 which are not covered, removing the cover 11, depositing a second cladding layer 15 of a second cladding material to fill the trenches 7 which were previously covered, removing core material outside the trenches 5,7,9 and applying a cladding layer to cover the trenches.

2 Claims, 8 Drawing Sheets

(a)

(b)

(a)

(b)

FUNCTIONAL OPTICAL DEVICES AND METHODS FOR PRODUCING THEM

FIELD OF THE INVENTION

The present invention relates to optical devices of the kind which transform light transmitted through them ("functional optical devices"). The invention further relates to methods for producing the functional optical devices.

BACKGROUND OF INVENTION

Recently there has been a growth in demand for improved functional optical devices, especially for use in DWDM (dense wavelength division multiplexing) systems. It has become necessary to provide improved functional optical devices such as Mux (multiplexer) devices, DeMux (demultiplexer) devices, amplifiers, optical switches and VOA (variable optical attenuator) devices.

It is known to form such devices as PLC (planar lightwave circuits), in which light moves along paths defined by cores extending over a substrate in a plane parallel to the surface of the substrate. Conventional PLC fabrication methods produce cores which are either ridge structures or trench structures. Ridge-type cores are ridges of a selected core material upstanding from a layer of cladding material formed over the substrate. Trench-type cores are formed by depositing a selected material within a pre-formed trench in a layer of cladding material which itself overlies the substrate. Generally, ridge structures are more common than trench structures.

The fabrication method of a ridge-type core is typically as follows. Firstly, a substrate such as Si is covered by a cladding layer of a cladding material (such as $SiO_2$), and then a layer of core material (such as $SiO_2$ including $GeO_2$), which is to be formed into the core. A mask is applied in selected regions over the core layer, and the exposed portions of the core layer are etched by an etching process such as reactive ion etching (RIE), to leave the ridges of the core material. After the mask is removed, a further cladding layer is provided over the surface of the device, so that the ridges are fully embedded between two cladding layers.

Although this method is successful, it is difficult to modify it to produce a device in which different portions of the core are formed of different materials, since depositing each core material requires a series of process steps. Additionally, it is difficult to control the thickness of the two different core materials at regions when they meet.

One example of a device having two different core materials is U.S. Pat. No. 6,201,918, which describes a device in which a Mach-Zehnder interferometer having two optical fiber arms is processed by splicing an optical path changing segment into one of the arms.

SUMMARY OF THE INVENTION

The present invention aims to provide new and useful optical devices, and new and useful methods for producing optical devices.

In general terms the present invention proposes that an optical device is formed having one or more cores which are trenches, different portions of the core(s) being formed from different materials.

The invention is based on the realisation that it is easier to form trenches of different materials than to form ridges of different materials. This factor more than compensates for the factors because of which ridge-type cores are normally preferred to trench-type cores.

The optical devices may be formed by the steps of forming trenches within a cladding layer (normally a cladding layer which is located on a substrate), covering certain areas of the trenches, depositing a first core layer of a first core material to fill the trenches which are not covered, removing the cover, depositing a second core layer of a second core material to fill the trenches which were previously covered, removing core material outside the trenches, and applying a cladding layer to cover the trenches.

Preferably, the core material outside the trenches is removed by polishing. Previously polishing techniques were not capable of polishing the whole surface of an optical device with an accuracy on the level of the dimensions of desired trenches (e.g. 6 micrometers), which is one reason why ridge-type cores are conventionally preferred to trench-type cores. However, the present inventors observe that advances in polishing techniques have removed this factor, making trench-type cores more acceptable.

It is to be understood that the present invention is not limited to the case in which there are exactly two different core materials. Rather, the present invention makes it possible to form optical devices in which any number of different materials are used to form different portions of the cores. Each material is deposited into the respective portion (s) of the trenches at a time when all the other portions of the trenches are either already filled by a previously deposited core material or covered.

The present invention makes it possible to form a variety of devices having cores composed of different materials. Examples of such devices are given below, and include, but are not limited to amplifier devices, interferometer devices such as Mach-Zehnder interferometers, arrayed-waveguide gratings, thermo-optic switches, variable optical attenuators, and gain flattening devices.

In particular the present invention makes it possible to provide optical devices which have predefined thermal characteristics.

For example, in some optical devices according to the invention, optical paths of differing geometrical lengths include portions of different respective core materials (so that they have different optical path lengths, i.e. the product of the geometrical length and the refractive index value). The various core materials are selected to have different thermal properties, such that although the paths have different geometrical lengths, the optical path lengths vary with temperature in the same way (i.e. the differing core materials compensate for the differing geometrical lengths of the optical paths). In this way it is possible to ensure that the performance of the overall optical device is not temperature dependent.

Alternatively, in other devices a temperature dependence is actually desirable. The present invention makes it possible to tailor this temperature dependence by appropriate selection of different core materials.

Specifically, a first expression of the invention is a method of producing an optical device, the method including the steps of:
    forming trenches within a cladding layer;
    covering certain areas of the trenches;
    depositing a first core layer of a first core material to fill the trenches which are not covered;
    removing the cover;
    depositing a second core layer of a second core material to fill the trenches which were previously covered;
    removing core material outside the trenches; and applying a cladding layer to cover the trenches.

A second expression of the invention is an optical device having one of more cores defining one or more optical paths, each core being formed as a trench within a cladding layer, different portions of the core or cores being composed of different core materials.

BRIEF DESCRIPTION OF THE FIGURES

Preferred features of the invention will now be described, for the sake of illustration only, with reference to the following figures in which.

DETAILED DESCRIPTION OF THE EMBODIMENTS

A method of forming an optical device according to the invention is shown in FIGS. 1(a) to 1(e). Below, a method is shown of producing a waveguide with differing core materials, such as one into which have been introduced a dopant such as $GeO_2$ which increases refractive index, and/or a dopant such as $B_2O_3$ which is effective to reduce the temperature dependence of the refractive index.

The method employs a substrate layer 1, which may for example be a Si wafer having a diameter of 3 inches (7.5 cm) and 1 mm thickness. Firstly, the substrate layer 1 (e.g. Si), shown in FIG. 1(a) in cross-section, is covered by an under cladding layer 3. The under cladding layer 3 may be a silica glass film, which is formed by plasma enhanced chemical vapour deposition (referred to here as PECVD). The gas material is tetraethoxysilane ($Si(OC_2H_5)_4$, referred to here as TEOS) and oxygen ($O_2$). Trenches 5, 7, 9 within the under cladding layer 3 may be formed using a photolithographic method which is widely used in semiconductor industry. For the silica glass film etching, reactive ion etching (here referred to as RIE) technology is adopted using fluorine-containing gas. For this, in order to form the trenches with a precise square form, an inductively coupled plasma (here referred to as ICP) RIE apparatus, such as an RIE-200iPC apparatus produced by the Samco company, is useful. As the fluorine containing gas, trifluoromethane ($CHF_3$) is used at about 5 mTorr. Radio frequency electric power of 103 Watts at 13.56 MHz is supplied to the coil. A film of Cr of thickness 100 nm prepared by sputtering is used as a mask. After the formation of the trenches, the Cr mask remaining on the cladding layer 3 is removed by oxygen plasma etching using the same RIE apparatus.

Figure 1A:
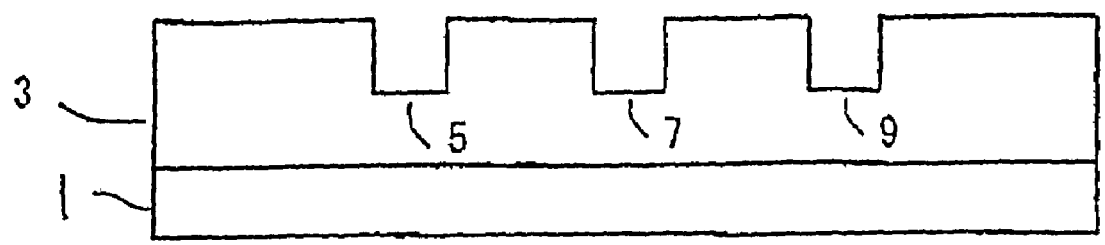
FIG. 1, which is composed of FIGS. 1(a) to FIG. 1(e) shows steps in the formation of an optical device which is an embodiment of the invention.

Alternatively, the substrate itself can be used as the under cladding layer when the substrate material is applicable for cladding (e.g. if it is silica). These trenches 5, 7, 9 are shown in FIG. 1(a) in an end-on view, and with a square cross-section. Typically, the trenches may have a depth of about 6 micrometers and a width of about 6 micrometers, although of course other dimensions are possible.

Figure 1B:
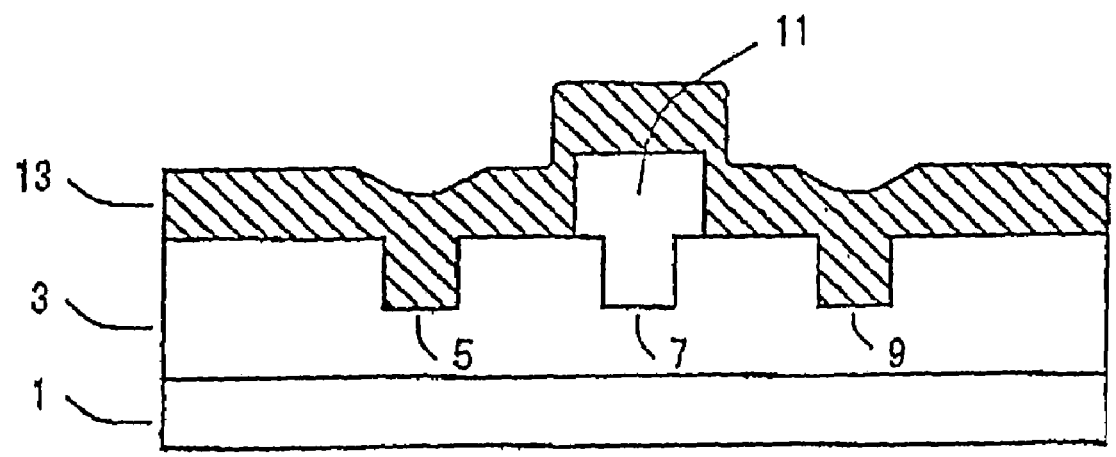

As shown in FIG. 1(b) a cover 11 is deposited over a portion of the under cladding layer 3 by known techniques, such as a lift off process using a photoresist material as the cover. The cover 11 covers one or more portions of one or more of the trenches (in FIG. 1(b) it is shown covering trench 7) but exposes other portions of the trenches (in FIG. 1(b) it is shown exposing the trenches 5, 9). A first core layer 13 of a first core material is then deposited, filling the exposed trenches 5, 9. The core may be a Ge—B co-doped silica glass film deposited using the PECVD technique. In order to get high quality core glass, an ICP CVD apparatus, such as a PD-160iP apparatus produced by the Samco company, is useful. Any of the following may be used as the raw material gas: TEOS, tetramethoxygermane ($Ge(OCH_3)_4$, here referred to as TMOG) and triethoxyborane ($B(OC_2H_5)_3$). Instead of triethoxyborane, trimethoxyborane ($B(OCH_3)_3$) may be used as the boron-containing raw material gas. By controlling the flow rate of the raw material gas, the amount of dopant contained in the grown film varies. In order to obtain the desired composition of the deposited glass film, it is advantageous to adjust the CVD conditions, such as the gas pressure in the vacuum chamber and ICP power. The gas pressure during the deposition process may be 5.0 pa. The radio frequency power at 13.56 MHz supplied to the ICP device and to the substrate electrode may respectively be set to 900 and 300 W. The substrate temperature may be 250° C. By controlling the flow rate of the raw material gas, a film can be obtained having a composition of germanium oxide 12.5 mole %, boron oxide ($B_2O_3$) 6.2 mole %, and silicon oxide 81.3 mole %. The deposition time was 120 minutes, and the obtained film thickness was 7 μm.

Figure 1C:
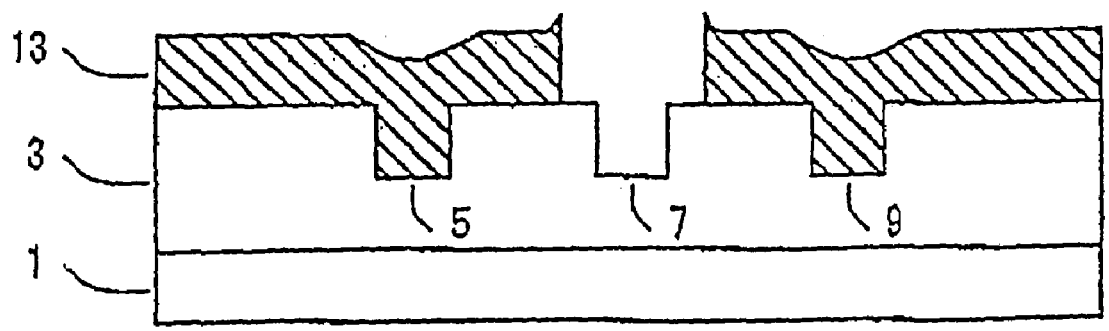

As shown in FIG. 1(c) the cover 11 is then removed (again by any known technique, such as an $O_2$ plasma etching method), thus exposing the trench 7.

Figure 1D:
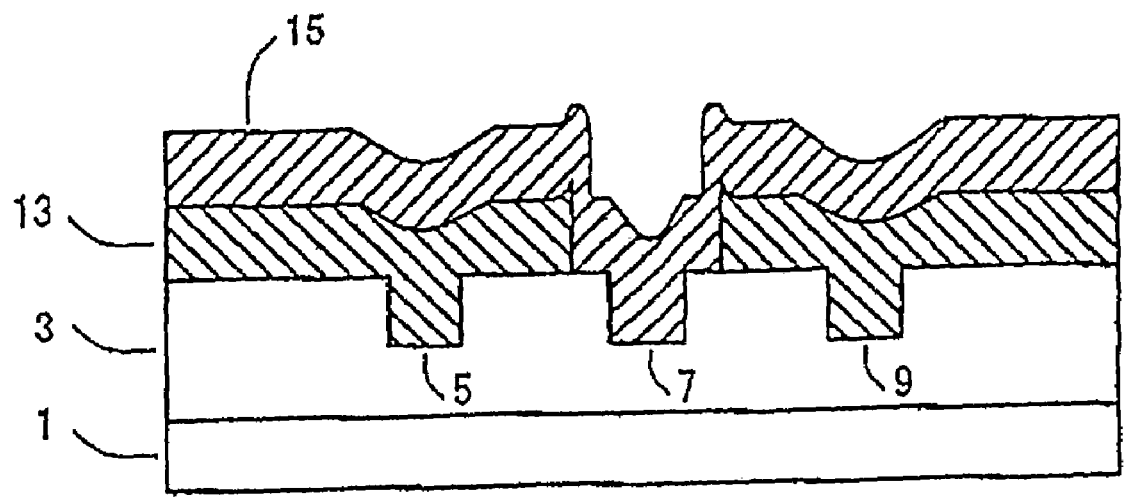

A second core layer 15 of a second core material is then deposited, filling the exposed trench 7, as shown in FIG. 1(d).

Figure 1E:
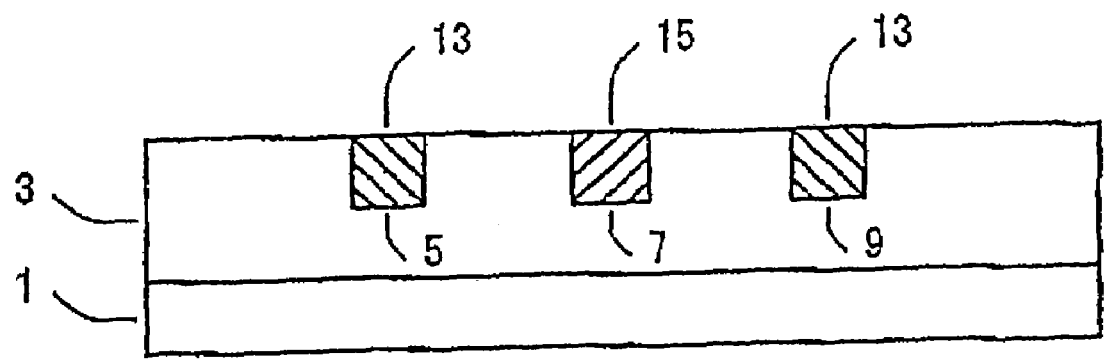

As shown in FIG. 1(e), the portions of the core layers 13, 15 which are outside the trenches 5, 7, 9 are removed, by polishing, leaving cores in the trenches 5, 7, 9. Specifically, trenches 5, 9 are filled with the first core material 13, while trench 7 is filled with the second core material 15. An upper cladding layer (not shown) may then be deposited over the surface of the device, so as to cover all the cores.

Note that the polishing should be performed with a high degree of accuracy. This is because if, alternatively, the polishing is uneven such that one side of the substrate surface is polished by a few micrometers more than the other side, then the cores on the first side of the substrate may be partially removed. The remaining trenches will then be of different depths.

Note that the deposition of the various materials can be accomplished in various ways according to any known technique(s). For example, any one of the layers may be formed by chemical vapour deposition (CVD), or alternatively by flame hydrolysis deposition (FHD) employing one of the reactions:

$$SiCl_4 + 2H_2 + O_2 \rightarrow SiO_2 + 4HCl,$$

$$GeCl_4 + 2H_2 + O_2 \rightarrow GeO_2 + 4HCl, \text{ or}$$

$$Si(OC_2H_5)_4 + H_2O \rightarrow SiO_2 + \text{organic compounds}.$$

Apart from these materials, materials such as tantalum oxide, titanium oxide, silicon nitride, tantalum nitride, silicon carbide, tantalum carbide, titanium carbide can be used.

The method according to the invention for forming waveguides having differing core materials can be used to produce various functional optical devices, such as amplifier devices, devices with a wavelength division multiplexing function, and light beam spot-size converters. In the following text, preferred examples of such devices are given. Note, however, that the present invention is not limited to these devices, which are presented for the purposes of illustration.

Figure 2:
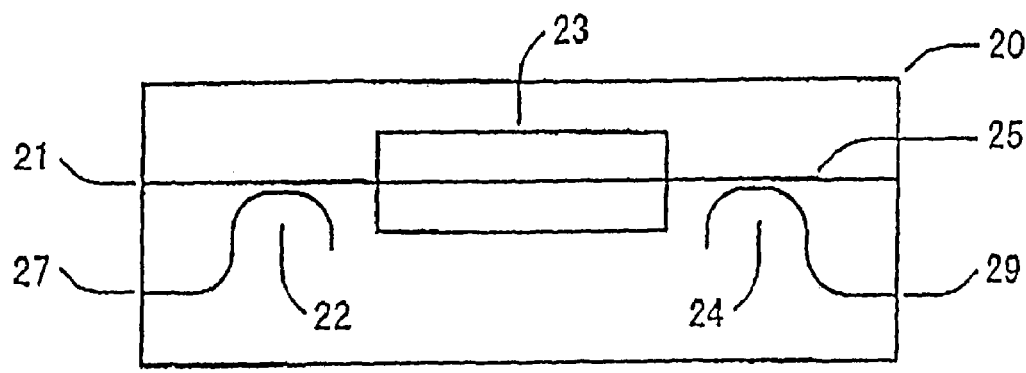
FIG. 2 shows a PLC amplifier device which is an embodiment of the invention.

A first device which is an embodiment of the invention is shown in FIG. 2, which is a top view of an erbium doped waveguide amplifier (EDWA) device 20 according to the invention. As in known devices, the device 20 has an entry portion 21 for receiving a signal (from the left) which is concentrated into an amplification region 23 in which laser amplification occurs, to generate an output signal in region 25. Excitation light is input through inputs 27, 29 to amplification region 23 by couplers 22, 24. The present invention makes it possible to form the cores in the amplification region 23 of an erbium doped material, while the cores in the other regions 21, 22, 24, 25, 27, 29 are not doped. This is advantageous because it means that losses in regions 21, 22, 24, 25, 27, 29 are reduced.

An example of this embodiment was prepared using FHD (flame hydrolysis deposition). After fabricating the trenches by RIE, a first core material for the regions 21, 22, 24, 25, 27, 29 is formed by depositing Ge-doped silica glass soot on the cladding layer to fill up the trench, and consolidating it into a transparent glass film. The starting materials in this case were silicon tetrachloride ($SiCl_4$) and germanium tetrachloride ($GeCl_4$). Another possibility would be to use a different dopant which increases the refractive index, such as phosphorous which can be obtained from phosphorous oxytrichloride ($POCl_3$).

The second (erbium doped) core material can be obtained by performing a soot deposition step and then following it with an erbium doping step in which the soot is subjected to a solution soaking method using an aqueous solution of Erbium trichloride ($ErCl_3$). We can level of the erbium doping by adjusting the concentration of erbium aqueous solution, and the soaking time to the solution.

Figure 3:
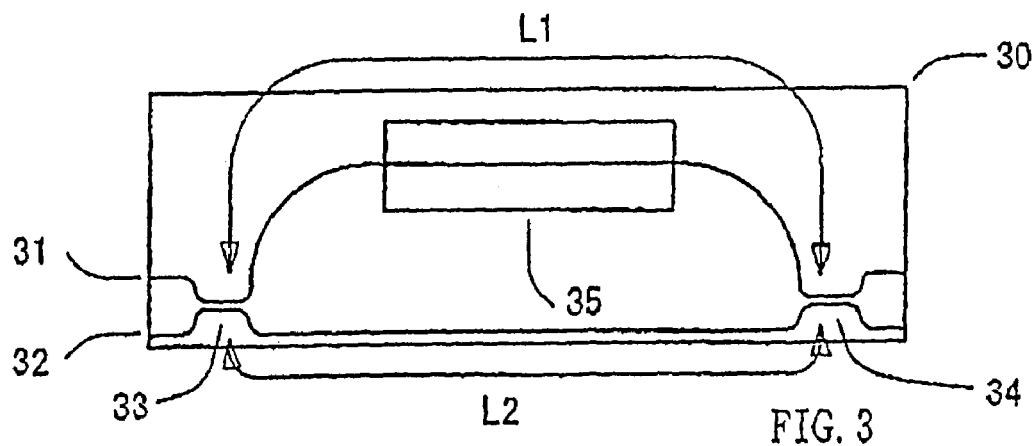
FIG. 3 shows a Mach-Zehnder interferometer which is an embodiment of the invention.

A second device which is an embodiment of the invention is shown in FIG. 3 which shows a top view of a Mach-Zehnder interferometer 30 having two optical paths 31, 32 defined by respective cores. Light which is input to one of the optical paths at the left of FIG. 3 is partially transmitted to the other of the optical paths at the coupler 33, and light on the two paths interacts at the coupler 34. The couplers 33, 34 may for example be directional couplers. Between these sections, the two light paths have respective geometrical lengths $L_1$ and $L_2$, which are different. As is well known to an expert, this means that the light which will be transmitted by the device has a wavelength λ which is equal to the refractive index multiplied by ΔL defined as $L_1$–$L_2$ and divided by an integer. The optical path lengths of each of the two paths are determined by the product of n×L where n is the refractive index of the path and L is its geometrical length.

In this embodiment all the cores are formed of the same material, except that the part of the cores in the region marked 35 are formed of a different material. Thus, each of the paths has a different length but also a different refractive index (which we can write respectively as $n_1$ and $n_2$). The two refractive indexes can be chosen in dependence on the lengths $L_1$ and $L_2$ such that, although each of the refractive indexes varies with temperature (with either a positive or a negative Δn/ΔT), the output of the interferometer is independent of the temperature, since the effects of the varying refractive indices are cancelled between the paths. Thus, a temperature independent Mach-Zehnder interferometer can be achieved.

In this embodiment, cancellation of the effects of the varying refractive indices is important. It is obvious that cancellation is obtained even if the region marked 35 is positioned on the opposite arm, namely the shorter arm. The following example is shown for this case.

We have constructed such a device by the following steps. First, trenches with selected dimensions were directly formed within Cr masked (3000 Å) silica substrate (Asahi, AQ, 1 mm thickness) by selective plasma etching (Samco, RIE-200iPC). $CHF_3$ and $C_3F_8$ were used as etching gas at a process pressure of 0.4 Pa. The Cr mask was then removed by $O_2$ plasma etching using the same system. A Ge—$SiO_2$ or Ge—B—$SiO_2$ film was deposited by an inductively coupled plasma chemical vapor deposition (ICP-CVD, Samco PD-160iP). Tetraethoxysilane, tetramethoxygermane, and triethoxyborane were used as the source materials for $SiO_2$, $GeO_2$, and $B_2O_3$ growth, respectively. The trench gap filling results were observed by SEM. Component analysis and depth profile study were applied using TOF-SIMS. The refractive indexes of the films were checked by a prism coupler. We could control the refractive indexes by adjusting the Si, Ge, and B content in the film. The sample was then annealed at 1000° C. in an atmosphere for 2 hrs after deposition to stabilize the refractive index of the core materials. The core materials outside the trenches are removed by planar surface polishing (Nanofactor, NF300) with accuracy of 0.2 μm. The trenches were over-cladded using another silica glass substrate by perfect optical contact followed by 1000° C. thermal bonding. The polished surface is smooth enough for this cladding method to be applied. As a result, buried waveguides with symmetrical structure which might reduce the polarization dependent loss were obtained in very short time and with low cost.

As discussed above, certain areas of the trenches were covered during the first core material deposition. The covering could be performed by a lift off process using certain material as a photoresist. However, we were short of good photoresist material, so instead we used sharp-edged glass chip with selected length. The trenches that were not covered were filled with the first kind of material by the ICP-CVD process. The cover was then removed. The second core material was deposited by the ICP-CVD process to fill the trenches which were previously covered. After an annealing process, the samples were polished to remove the films outside the trenches and cladding material was applied to the surface by optical contact and thermal bonding.

The Mach-Zehnder interferometer filter was designed as shown in FIG. 3 (and employing geometric principles used in U.S. Pat. No. 6,201,918), with double directional 3 dB couplers at 1.55 µm range. The core dimension is 7.5 µm and the corresponding refractive index of the core was 1.4632 at 0.6328 µm. The two light paths had a geometric length difference of $\Delta L \approx 1$ mm, resulting in a pass-band pitch of 200 GHz (1.6 nm).

As a comparison, Mach-Zehnder interferometer devices were made using only one kind of core material. Silica based materials with different doping ratios of Ge (8–10 mol. %) and B (1–5 mol. %) were used to test wavelength temperature dependence (d$\lambda$/dT) for the device with one core material. Then, embodiments with two kinds of core material were prepared to test the d$\lambda$/dT characteristics.

The device characteristics were measured using a tunable laser source (Agilent 81689 A) with a wavelength range from 1.525 to 1.575 µm, and a power sensor (Agilent 81634 A). The temperature of the Mach-Zehnder interferometer filters was controlled to be −20, 0, 30, 51 and 80° C. by a temperature chamber (Yamato IW 241) during measurement. The wavelength temperature dependence (d$\lambda$/dT) of the filter device was calculated as the pass-band peak shift against temperature change.

The wavelength temperature dependence (d$\lambda$/dT) of the Mach-Zehnder interferometer with one core material at the temperature range from −20° C. to 80° C. is shown in Table 1. As shown the $GeO_2$ and $B_2O_3$ doping of the core materials effectively changes the refractive index and d$\lambda$/dT; our data also shows that the refractive index decreases from 1.4640 to 1.4632 and d$\lambda$/dT decreases from 9.5 pm/° C. to 8.1 pm/° C. when the $B_2O_3$ concentration increases from 0 to 5 mol. % while the $GeO_2$ concentration remains at 8 mol. %. The lowest optical propagation loss of ~0.1 dB/cm at 1550 nm of our Mach-Zehnder interferometer devices were obtained. The higher propagation loss of 1.53 dB/cm might be caused by particle contamination in the waveguides during the fabrication process, which can be reduced by applying a sample cleaning technology in our process. The trench type Ge—B—$SiO_2$ planar waveguides exhibit reasonably low loss for the wavelengths of interest in integrated optics, and thus have promising applications.

TABLE 1

| Core composition | n (@ 632.8 nm) | d$\lambda$/dT @ 1550 nm | Propagation loss @ 1550 |
| --- | --- | --- | --- |
| $10GeO_2$—$90SiO_2$ | 1.4652 | 9.7 | 0.23 |
| $8GeO_2$—$92SiO_2$ | 1.4640 | 9.5 | 0.12 |
| $8GeO_2$—$1B_2O_3$—$91SiO_2$ | 1.4640 | 9.4 | 0.18 |
| $8GeO_2$—$2B_2O_3$—$90SiO_2$ | 1.4638 | 9.2 | 0.54 |
| $8GeO_2$—$4B_2O_3$—$88SiO_2$ | 1.4635 | 8.9 | 1.53 |
| $8GeO_2$—$5B_2O_3$—$87SiO_2$ | 1.4632 | 8.1 | 0.11 |

Figure 11:
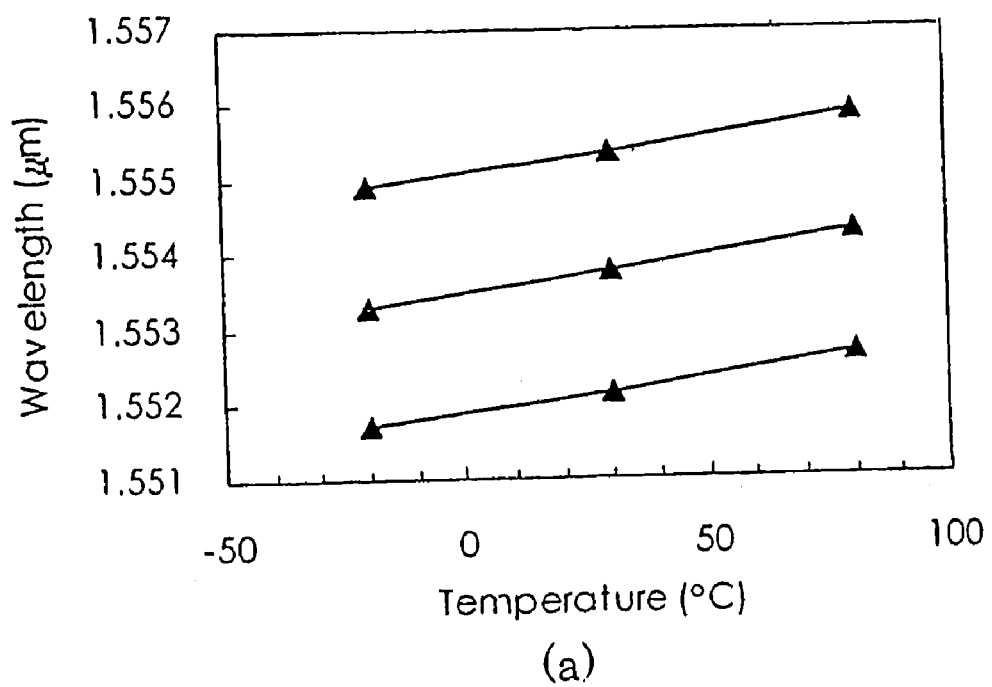
FIG. 11, which is composed of FIG. 11(a) and 11(b) shows experimental results of wavelength temperature dependence (dλ/dT) for comparative examples of a Mach-Zehnder interferometer, respectively having core compositions of (a) $10GeO_2\text{-}90SiO_2$ and (b) $8GeO_2\text{-}5B_2O_3\text{-}87SiO_2$.
Figure 11:
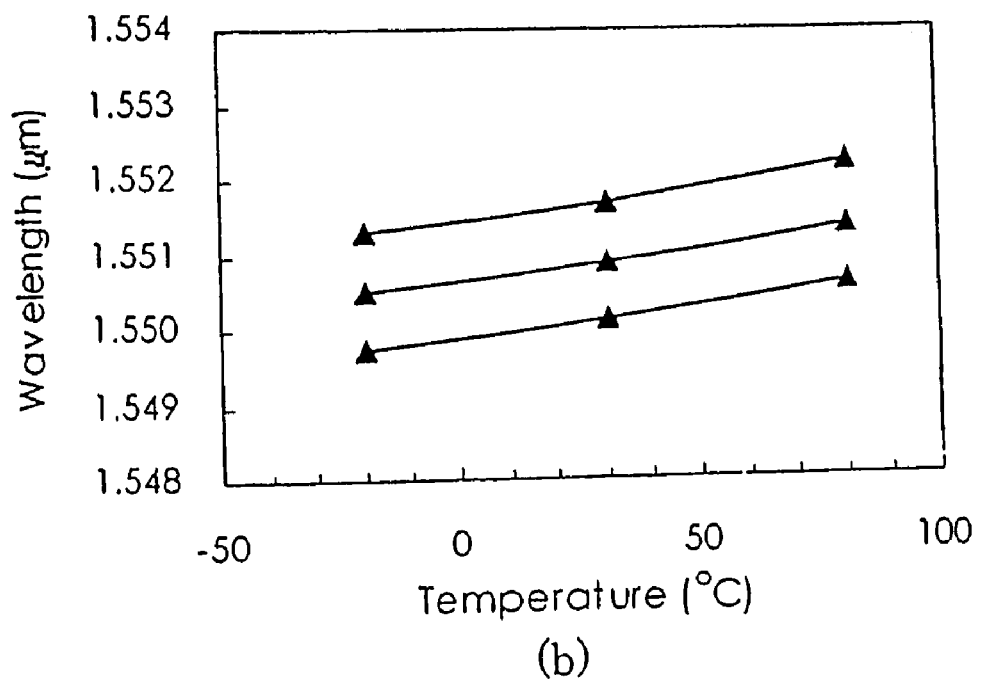

Due to the results summarized in Table 1, the two compositions of $8GeO_2$-$5B_2O_3$-$87SiO_2$ and $10GeO_2$-$90SiO_2$ were chosen to be core material 1 and core material 2, respectively, to prepare the Mach-Zehnder interferometer filters of FIG. 3 (but with the region 35 positioned on the path 32, i.e. on the opposite shorter arm) by the multi-core fabrication method described above to test the athermal property. They have significant different d$\lambda$/dT of 8.1 pm/° C. and 9.7 pm/° C. as shown respectively in FIGS. 11(a) and 11(b), which correspond to different refractive index temperature dependences of $dn_1/dT$ and $dn_2/dT$, respectively. The reason we chose $8GeO_2$-$5B_2O_3$-$87SiO_2$ as core material 1 is that its refractive index 1.4632 is close to the designed refractive index value at coupling area. For the devices consist of two different core material sections with different values of $dn_1/dT$, $dn_2/dT$, and a certain relationship between their lengths, the athermal condition is:

$$(dn_1/dT)\Delta L = [(dn_2/dT) - (dn_1/dT)]L_{core2}.$$

Here $L_{core2}$ is the geometric length for core material 2 ($10GeO_2$-$90SiO_2$) section at the shorter path. Although the optical path length of each of the core material varies with temperature, the effects of the varying optical path lengths can be made to cancel by choosing a suitable value for the length $L_{core2}$; thus the output of the device is independent of the temperature. Because the substituted region 35 of the second core material still has the waveguide structure, we can adjust the geometric length $L_{core2}$ without worrying that it will generate extra propagation loss. We tried different $L_{core2}$ from 7.6 mm to 17 mm, different values of d$\lambda$/dT from 3.75 to −2.85 pm/° C. with temperature from −20° C. to 80° C. were obtained in our experiments as shown in Table 2. The theoretically estimated values of d$\lambda$/dT with different $L_{core2}$ are also listed for comparison, which agree fairly well with the experimental results.

TABLE 2

| Geometric length | d$\lambda$/dT @ 1550 nm (pm/° C.) | | Propagation loss |
| --- | --- | --- | --- |
| $L_{core2}$ (mm) | Estimated | Measured | @ 1550 (dB/cm) |
| 7.6 | 3.89 | 3.75 | 0.64 |
| 9.6 | 2.21 | 2.00 | 1.77 |
| 15 | 0.75 | 0.54 | 1.73 |
| 17 | −2.93 | −2.85 | 0.61 |

Figure 12:
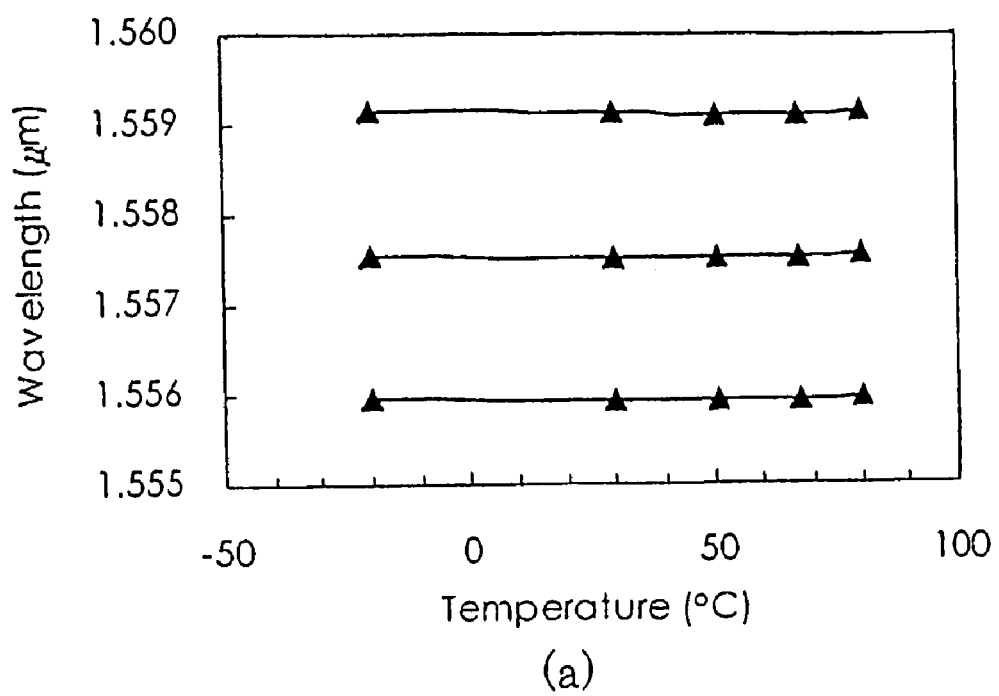
FIG. 12, which is composed of FIG. 12(a) and 12(b) shows experimental results of wavelength temperature dependence (dλ/dT) for Mach-Zehnder interferometers, both having the first core material of $8GeO_2\text{-}5B_2O_3\text{-}87SiO_2$, and the second core material of $10GeO_2\text{-}90SiO_2$, which are embodiments of the invention, respectively having geometric lengths of the second core material of (a) $L_{core2}=15$ mm and (b) $L_{core2}=17$ mm.
Figure 12:
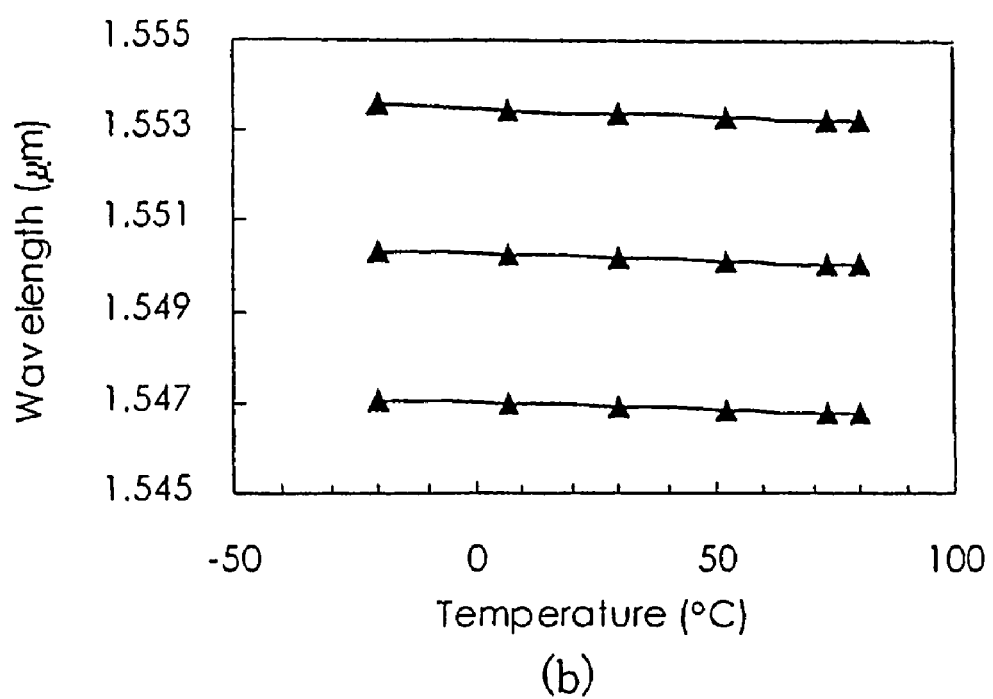

Our best athermal result of the prepared Mach-Zehnder interferometer filter shows the d$\lambda$/dT of 0.5 pm/° C. when $L_{core2} \approx 15$ mm, as shown in FIG. 12(a). This is small enough even for the 50 GHz pitch filters. The measured 3-dB bandwidth of 1.6 nm is close to the designed channel separation. By increasing the geometric length $L_{core2}$ to 17 mm, even a negative value of −2.85 pm/° C. for d$\lambda$/dT was obtained, as shown in FIG. 12(b)! This shows that it is possible for us to control the d$\lambda$/dT from positive to negative value for different functional purposes. The excess loss can be reduced to be negligible by optimizing the fabrication technology.

Figure 4:
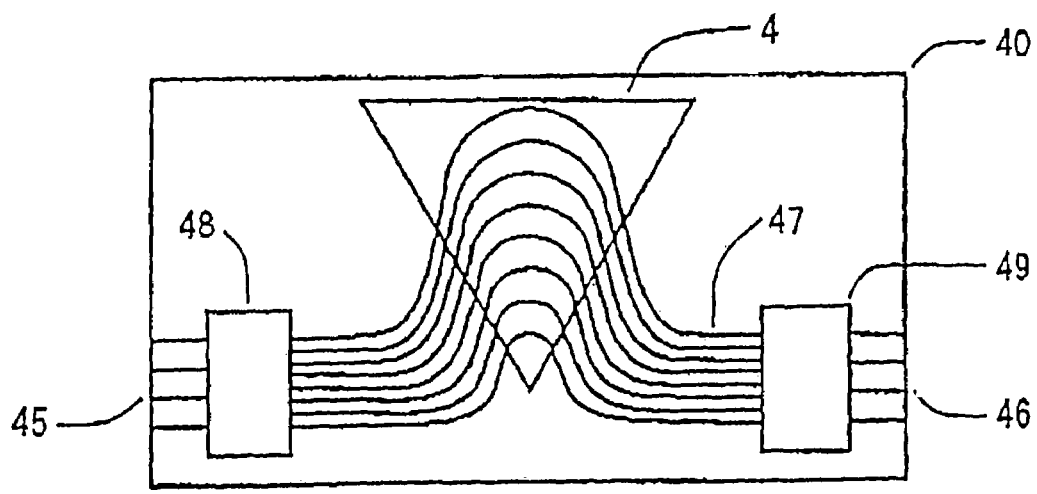
FIG. 4 shows an arrayed-waveguide grating which is an embodiment of the invention.

A third device which is an embodiment of the invention is shown in top-view in FIG. 4, an AWG device 40. The device has an input region 45 and an output region 46, spaced apart by an array region 47 in which each of the paths flexes. The device 40 has two coupling sections 48, 49, for example slab waveguides. A light signal containing two wavelength components with respective wavelengths $\lambda_1$ and $\lambda_2$ is launched into some path in the input region 45, and transmitted through the device obtaining one path of the output region 46 has wavelength $\lambda_1$ and another wavelength $\lambda_2$. Most of the cores are composed of a first core material, but the portion of the cores which intersect within the substantially triangular region 4 are of a second (different) core material from the material outside the triangular region 4. Note that this means that the different light paths, which are of different respective geometrical lengths in the region 4, include different respective geometrical lengths of the second core material (i.e. the intersection of the optical paths with the region 4 varies with the geometrical length of the paths). An appropriate selection of the two core materials provides temperature compensation of the kind described above, whereby the functionality of the AWG is temperature independent.

The arrangement of FIG. 4 is appropriate when $\Delta n/\Delta T$ of the cores in the region 4 is lower than the $\Delta n/\Delta T$ of the cores outside the region 4. If the opposite were true, the triangle 4 could be formed vertically inverted (i.e. to point upwards in FIG. 4) so that the longer paths would have a shorter geometrical length of intersection with the region 4.

An array waveguide diffraction grating using the above structure is made as follows. Using a synthetic quartz glass ($SiO_2$) substrate of thickness 1 mm and diameter 76 mm (3 inches) as a direct cladding, trenches are formed using RIE in an optical waveguide pattern forming an array waveguide diffraction grating. The waveguide regions 45, 46, 47 shown in FIG. 4 were formed with a width of 6 μm, and a depth of 6 μm, and the narrowest spacing (i.e. the width of the cladding formed between two adjacent channels) is appeared as 4 μm at the region of FIG. 4 in which the array waveguide 47 meets the coupling sections 48, 49. The coupling sections are slab waveguides having a width of 5 mm, a length of 12 mm and a depth of 4 μm.

The second core material of the triangular region 4 in FIG. 4, and the first core material of the other trenches are formed by PECVD. Annealing process after deposition is effective to improve the qualities of the glass, such as suppressing fractuation of the refractive index, and removing impurities such as hydrogen. The annealing conditions are 1100° C. and 30 minutes. This temperature is higher than the glass transition temperature of the core glass, but lower than the softening temperature of the cladding glass which is $SiO_2$.

The surface of the embodiment is polished to remove the films outside the trenches and cladding material was applied to the surface by optical contact and thermal bonding. The thermal bonding was carried out for 30 minutes at 1100° C.

The upper cladding layer may alternatively be formed by deposition.

Two patterns of AWG were formed at the same time on a single substrate, so in order to get the AWG devices from this substrate, it was necessary to be diced into a chip having a AWG circuit. Then, the respective waveguides of the input region 45 and output region 46 are connected to respective fibres. Signals are input and output using these fibres. When these fibres are provided, the device is completed.

An AWG device was produced in this way, having a operating wavelength range of 1.551 μm band and with a channel spacing of 0.8 nm (corresponding to an interval of 100 GHZ), and having 41 channels. The characteristics of this device were measured by connecting one input port near the middle of the input region 45 to a tunable laser source, and measuring the light signal output from one output port of the output region 46. In order to measure the temperature characteristics, the whole device was installed in an temperature control chamber, and the temperature was raised in steps, and once the temperature had stabilized sufficiently the wavelength of the output light signal was measured. In the case of raising the temperature from −20° C. to 80° C., the total change of the output wavelength of the AWG device with the structure of the embodiment was found to be adequately low. Specifically, it was 0.05 nm. Note that according to reported data, the change of the output wavelength in prior art AWG is 0.012 nm/° C., from which one can estimate that the change between −20° C. and 80° C. was 1.2 nm. Due to this value, even if the channel spacing is 1.6 nm, precise control of the temperature of the device is required for practical applications, in case the change in the output wavelength becomes too high.

Note that U.S. Pat. No. 6,304,687 shows an AWG device in which an array of waveguides is interrupted by a triangular resin section which exhibits a negative $\Delta n/\Delta T$ placed in an array region of an AWG in a configuration similar to the positioning of the triangular region 4 in the array region 47. Although there are no core paths in this region, light is able to propagate within the resin from one side to the other, and different light paths include different lengths of resin. Thus, an appropriate selection of the resin material makes it possible to achieve temperature compensation in a way similar to the embodiment described above. However, this device is subject to severe losses, since light is undirected while propagating within the resin triangle. The present embodiment is not subject to this disadvantage, since all light paths have light guiding structures (i.e. cores and cladding material) along substantially their entire lengths, albeit of differing materials in different locations.

Figure 5:
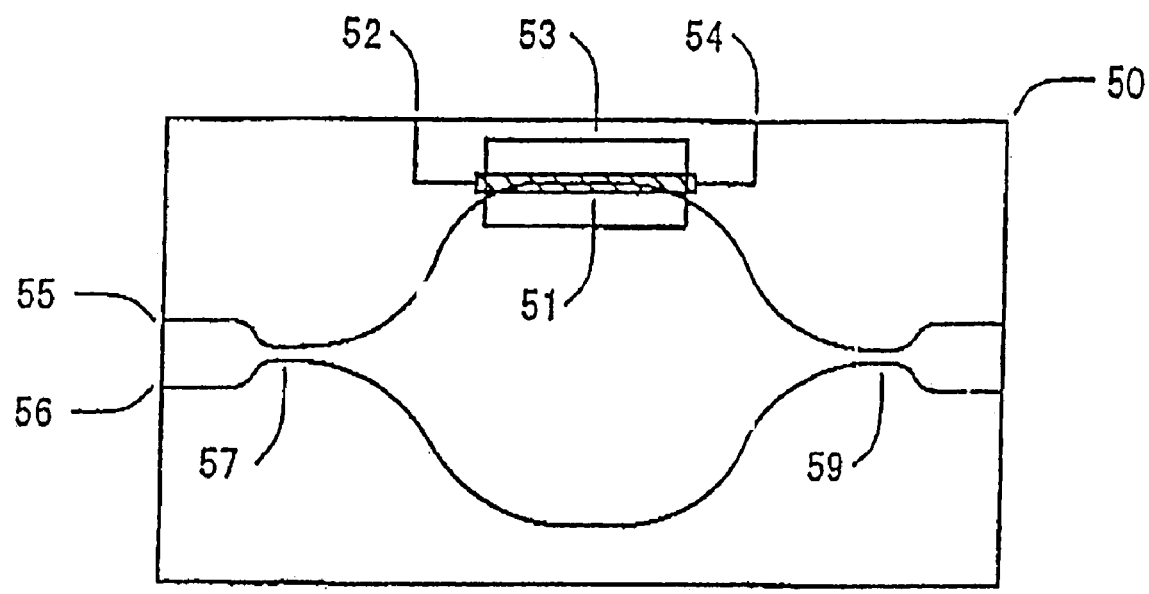
FIG. 5 shows a thermo-optic switch which is an embodiment of the invention.

Whereas the embodiments above attempt to achieve temperature independent operation, other known functional optical devices actually utilize the temperature dependence. For example, a fourth device which is an embodiment of the invention, a thermo-optic light switch 50, is shown in FIG. 5. This device consists of symmetric Mach-Zehnder interferometer (MZ-I). In this case a resistor 51 has a temperature controlled by external leads 52, 54, so that the temperature along the portion shown within rectangle 53 can be varied in relation to that along other portions. This means that the temperature along part of the light path 55 can be varied in relation to that along a second light path 56. According to the temperature of the portion 53, light input to one of the light paths (say path 55) is transmitted either to the opposite end of the same light path or to the opposite end of the other light path. The resistor 51 is set close to the core to detect the temperature change sensitively. In this embodiment, over cladding with thickness of 20 μm after polishing is performed by FHD method. And then, the resistor 51 is prepared by sputtering of Cr on the cladding layer. There are two directional couplers 57, 59, and in these regions it is desirable that there is small temperature dependence. By using this MZ-I device, a switching operation can be achieved by changing the temperature along the portion shown within rectangle 53. The present invention thus proposes that a device 50 includes a portion of a different core material (one having a high temperature dependence) in the region of the optical path near the resistor 51 (e.g. the portion shown within rectangle 53), and material of relatively lower temperature dependence in other places to achieve stable coupling condition against temperature change. The core materials may be selected from those shown in Table 1. For example, the material having high temperature dependence can be $90SiO_2\text{-}10GeO_2$, and the one having a relatively lower temperature dependence may be $87SiO_2\text{-}8GeO_2\text{-}5B_2O_3$. In other variations of the embodiment, the $GeO_2$ may be replaced with materials such as tantalum oxide, titanium oxide, silicon nitride, tantalum nitride, silicon carbide, tantalum carbide, or titanium carbide.

Note that in the absence of heat generated by the resistor 51 the $\Delta L$ of the two paths is zero (it is symmetric), in contrast with the Mach-Zehnder interferometer of FIG. 3 which is intrinsically asymmetric.

Figure 6:
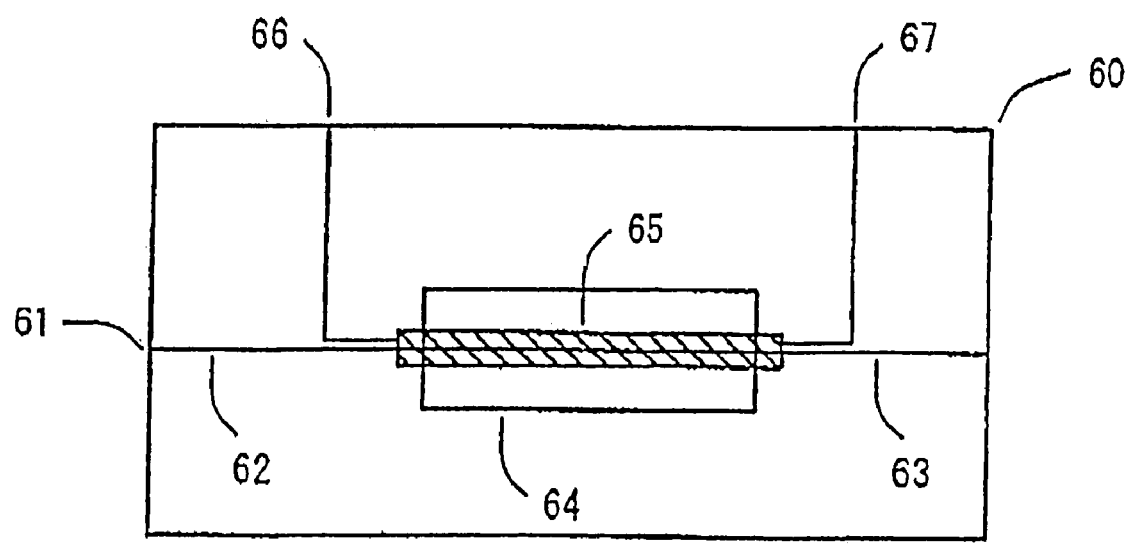
FIG. 6 shows a variable optical attenuator which is an embodiment of the invention.

A fifth device which is an embodiment of the invention is shown in FIG. 6, and is a variable optical attenuator (VOA)

60. The device includes a single optical path 61 defined by a trench-type core and having an entry portion 62, an exit portion 63 and between them a portion 64 at which the temperature is controlled by a resistor 65 operated by external leads 66, 67. The core material in the region 64 is thermochromic, and the core material in regions 62, 63 is not thermochromic. This makes it possible that the regions 62, 63 of the device should have low losses, as compared to known devices in which the core is entirely formed from thermochromatic material.

Figure 7:
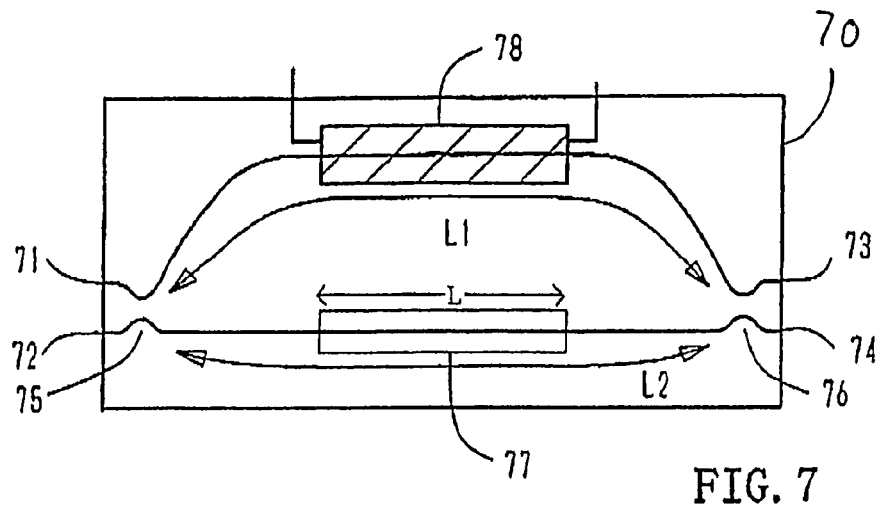
FIG. 7 shows another Mach-Zehnder interferometer which is an embodiment of the invention.

A sixth device 70 which is an embodiment of the invention is shown in FIG. 7. Again it is a Mach-Zehnder interferometer, but in this case it is one designed to be controllable, and thus operates as a VOA device. Specifically, a first path extends between an input 71 and an output 73, while a second path extends between an input 72 and an output 74. The different paths have different respective geometrical lengths $L_1$, $L_2$ between couplers 75, 76. The first path is heated in a heat-receiving section of its length by a resistor 78 controlled by electrodes. All these features are known in prior art Mach-Zehnder interferometer-type VOAs. However, in contrast to known systems the device 70 includes a region 77 of geometrical length L in which the core of the second path is of a different material from that of the rest of the device, and specifically one core material has a refractive index which increases to a great extent with increasing temperature, and the other core material has a refractive index which increases less than that of the first material. For example, the refractive index of the core material in the region 77 may increase less with increasing temperature compared to the material which composes the rest of the cores. Writing the increase in the refractive index of one path as $\Delta n_1$ and the increase of the refractive index of the other path as $\Delta n_2$, the critical measure is $\Delta n_1 - \Delta n_2$.

Figure 8A:
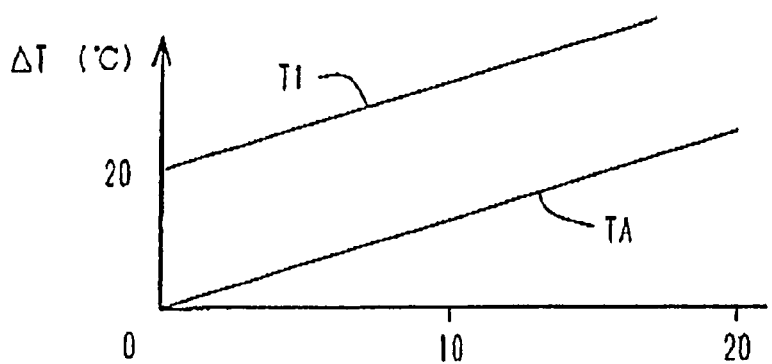
FIG. 8, which is composed of FIGS. 8(a) and 8(b), shows the temperature variation with time of a known Mach-Zehnder interferometer, and of the one of FIG. 7.
Figure 8B:
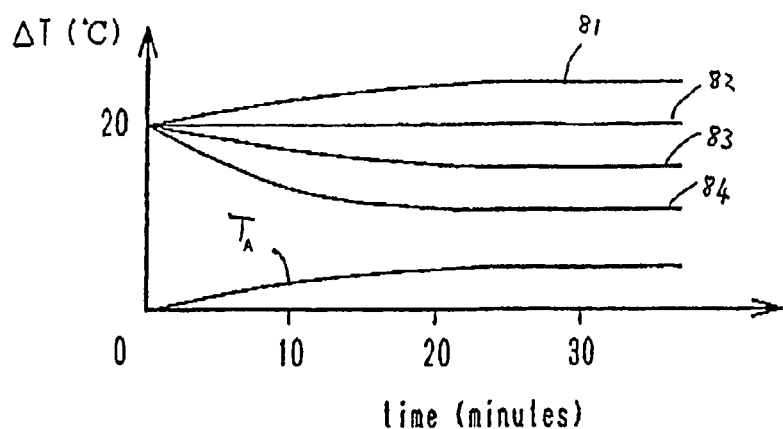

To understand the operation of the invention consider firstly what the operation of the device 70 would be if the region 77 were not present. In this case, since $L_1$ and $L_2$ have a geometric length difference $\Delta L$, the device 70 will only pass light having a wavelength $\lambda$ given by $m\lambda = n\Delta L$ where m is an integer and n is the refractive index. Upon a current being applied to the resistor 78, the temperature of the heat receiving section of the first path will increase, changing its refractive index, and thus changing the wavelength which is passed, resulting in a change of the transmitted power, so that the device acts as a VOA. Unfortunately, heat will also conduct in time to the lower path, changing its refractive index in the same way, and thus reducing the difference between the optical lengths of the paths. To address this, the current applied to the resistor 78 must be raised to increase the temperature of the upper path. As this cycle continues, the ambient temperature $T_A$ of the device, which is the temperature of the second path, rises linearly with time, for example as shown in FIG. 8(*a*) (in which the vertical axis indicates the rise in temperature caused by the resistor 78 during the operation of the device), and the temperature $T_1$ which is required to be applied to the heat receiving section of the first path by the resistor 78 rises. This gradually rising temperatures may cause the device to overheat, unless a cooling device, such as cooling fins, is used, thus increasing the size and cost of the device.

By contrast, since in the embodiment the region 77 is present, when heat spreads from the first path to the region 77 it changes the refractive index in the direction opposite to the change it causes in the first path. In other words, depending on the value L, the temperature dependence of the optical length of the second path varies. It may for example be zero, or it may be opposite to that of the first path. Thus, heat transmission from the first path to the second path need not prevent the Mach-Zehnder interferometer 70 from working, and it is not necessary to further increase the temperature of the first path to maintain the operation of the device 70. Thus, the device may be operated with the first path remaining at a lower temperature than in the known devices described above, which in turn means that less heat is transmitted to the first path. The device 70 may thus avoid the need for cooling fins to be present. The temperature dependence of the ambient temperature $T_A$ may thus be as shown in FIG. 8(*b*). Lines 81, 82, 83, 84 show, for four respective increasing values of L, the corresponding temperature at which the temperature of the heat-receiving section of the first path is maintained by the resistor 78. Line 82 is the case that the L is a length (e.g. 18 mm) such that the resistor 78 should maintain the temperature of the first path at the same value irrespective of the ambient temperature, while lines 83, 84 show the operation of the device for two higher values of L, and line 81 shows the operation of the device for a smaller value of L. Note that the initial rate of increase of temperature shown in line 81 is lower than that of T1 in FIG. 8(*a*). Gradually, all the curves $T_A$, 81, 82, 83 and 84 eventually reach constant values as an equilibrium state is reached.

As an example of this embodiment, the Mach-Zehnder interferometer-type VOA device may be an asymmetric one operating at a wavelength of 1.55 μm. The geometrical lengths between the couplers 75, 76 may be around 42 mm, and they may have a difference of $\Delta L = 4.24$ μm. Both the two core materials may have a refractive index of n=1.4632, but each may have a different temperature dependence, such as $\Delta n_1 = 9 \times 10^{-6}$ and $\Delta n_2 = 8.01 \times 10^{-6}$ respectively. The first core material may be deposited in the whole of the core area, except the region 77. The second core material may be deposited in the region 77, where the waveguide length may be L=18 mm. We prepares a device having these characteristics, and with a heater 78 having a length of 2 mm near to the longer path in FIG. 7. Using this device, when the temperature difference between the heater and the ambient temperature was required to be 20° C. in order to adjust into the desirable output power from the device, we found that the difference in temperature remains constant as shown as line 82 in FIG. 8(*b*) even though the ambient temperature gradually increased.

Note that many variations of the device 70 are possible within the scope of the invention. In particular, it is not necessary that the region 77 is provided on the opposite optical path from the resistor 78. For example, the region 77 may actually be the heat-receiving section of the first optical path.

We now turn to a further embodiment of the invention. This embodiment is motivated by the known difficulty of coupling two different optical devices. For example, it is often desired to couple two devices which each contain an optical path (e.g. two devices each containing an optical fibre), with the end of one fibre being connected to the end of the other fibre. The two fibres may have different respective widths (and therefore different refractive indices, even if the material they are formed from has the same propagation constant). In such situations a technique known as TEC (thermally expanded core) is used, in which atoms of a material such as Ge are allowed to diffuse outside of the core at the end of the fibre of narrower width, to thereby increase its effective width and thus decrease refractive index at the end, so that the sizes and refractive indices of the two fibres are made equal at the interface between them. However, TEC has a number of drawbacks, one of which is that it is not readily applicable to connecting a waveguide to an array of fibres, since the width of the end surface of the waveguide is too great (typically 1 mm, compared to 125 μm for a single fibre) for Ge diffusion to be convenient.

Figure 9:
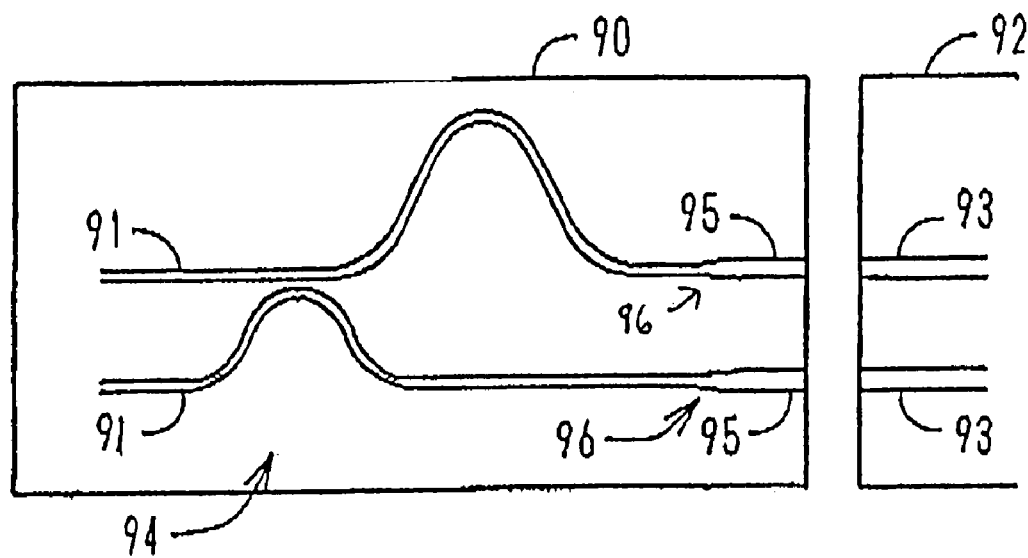
FIG. 9 shows a waveguide device which is a further embodiment of the invention.

To address this, consider a further embodiment of the invention shown in FIG. 9, which is a device 90 (such as a waveguide) which includes cores 91 (for illustration only two are shown, but usually the number of cores will be greater than 2, e.g. 10) and which is to be coupled to another optical device 92 including one or more fibres 93.

In particular, in order to make the waveguide device small adopting small bending radius of the waveguide patterns, one should attempt to keep the bending loss from becoming large. For this reason, the waveguides having large refractive index difference between the core and the cladding and small size of the core, so-called super-high delta waveguides, are very useful. In this case, the coupling loss at the connection between the waveguide and a conventional single mode optical fibre (with a core diameter of 8 μm) will become very big. This is the typical difficulty of coupling two different optical devices.

In this embodiment, the waveguide includes a functional portion 94 in which the cores 91 must have a smaller width of 4 μm and a refractive index of 1.4799, whereas the fibres 93 in a typical fiber array 92 have a greater diameter of 8 μm and are composed of a material having a smaller refractive index. In the embodiment, each of the cores 91 terminates by a respective waveguide 95 through a transition region 96 of the device 90 which is to be coupled to the device 92. Each waveguide 95 is of a different material having a refractive index of 1.4632 and a width of 7.5 μm, which is matched to that of the fibres 93.

Figure 10:
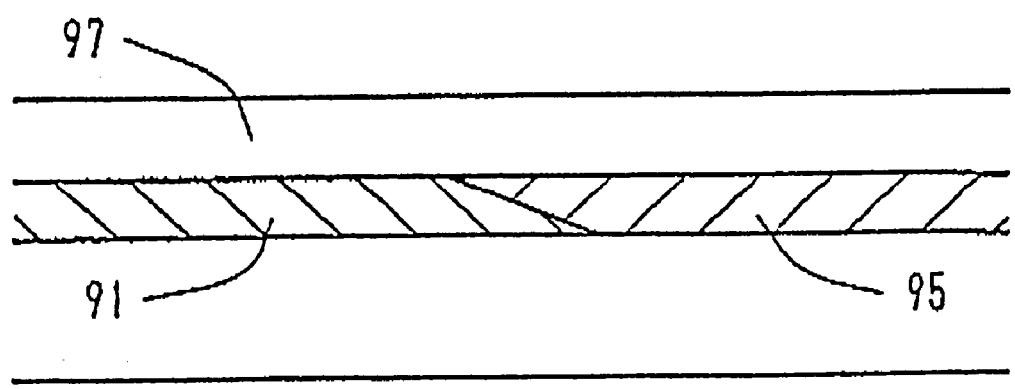
FIG. 10 shows a cross-sectional view of the waveguide device of FIG. 9.

At a transition region 96 of the device 90, core width is gradually spread from 4 μm to 7.5 μm. FIG. 10 is a cross-sectional view of part of the device 90 shown in FIG. 9 (in FIG. 10 the view is in a direction parallel to the surface of the device 90), showing a possible structure of the transition between the cores in the functional portion 91 and in the coupling waveguide 95. Both are covered by a cladding layer 97. This structure may be achieved by the methods described above.

Because of this, the coupling loss with the optical fibre array 92 is very much reduced, and the miniaturisation of the waveguide device became possible.

The application of this embodiment is not limited to coupling to a conventional optical fibre. Instead, the embodiment may be adapted to suit the mode field diameter of the output waveguide 93 of any other optical device 92.

All of the devices 20, 30, 40, 50, 60, 70, 90 are preferably formed by the method of the invention described above in relation to FIG. 1. In particular, indeed it is considered that this is presently the only commercially realistic way in which they can be formed, the invention is not limited in this respect.

Although preferred embodiments of the invention have been described above, many variations are possible within the scope of the invention as will be clear to a skilled reader. For example, although all the devices shown have only two different core materials in different regions, the invention is not limited in this respect and devices according to the invention may include core regions formed of any number of different respective core materials.

The invention claimed is:

1. A method of producing an optical device, the method comprising:
   forming trenches within a cladding layer;
   covering certain areas of the trenches with a cover comprising a photoresist material, wherein the cover is formed by a liftoff process;
   depositing a first core layer of a first core material to fill the trenches which are not covered;
   removing the cover;
   depositing a second core layer of a second core material to fill the trenches which were previously covered;
   removing the first and second core materials outside the trenches in a single process step; and
   applying a cladding layer to cover the trenches.

2. A method according to claim 1, further comprising removing the core material outside the trenches by polishing.

* * * * *